United States Patent [19]

Carver

[11] Patent Number: 4,550,153

[45] Date of Patent: Oct. 29, 1985

[54] ELASTOMER BASED ON CRUDE DIPHENYLMETHANE DIISOCYANATE AND ANILINE IN THE RIM PROCESS

[75] Inventor: Thomas G. Carver, Summit, N.J.

[73] Assignee: BASF Wyandotte Corporation, Wyandotte, Mich.

[21] Appl. No.: 665,187

[22] Filed: Oct. 26, 1984

[51] Int. Cl.$^4$ .................. C08G 18/30; C08G 18/16
[52] U.S. Cl. ............................ 528/49; 528/67; 528/75; 521/137; 521/163; 521/128; 264/54; 264/328.2; 264/331.12; 264/331.19
[58] Field of Search .................... 528/49, 67, 75; 521/163, 128

[56] References Cited

U.S. PATENT DOCUMENTS 3,401,133  9/1968  Grace et al. ................... 528/49
3,635,907  1/1972  Schulze et al. ................ 528/49
4,190,711  2/1980  Zdrahala et al. .............. 521/112
4,250,292  2/1981  Niederdellman et al. ....... 528/49

*Primary Examiner*—Herbert S. Cockeram
*Attorney, Agent, or Firm*—Norbert M. Lisicki

[57] ABSTRACT

A RIM polyurethane elastomer prepared by reacting an organic polyisocyanate, a polyoxyalkylene polyether polyol, and a chain extender in the presence of an effective amount of aniline. Improvements in tensile and tear strength are realized.

12 Claims, No Drawings

ELASTOMER BASED ON CRUDE DIPHENYLMETHANE DIISOCYANATE AND ANILINE IN THE RIM PROCESS

BACKGROUND OF THE INVENTION

1. Field of the Invention

This invention relates to the preparation of reaction injection molded (RIM) polyurethane elastomer. It more particularly relates to the preparation of reaction injection molded polyurethane elastomers which have improved elongation and tear strength characteristics.

2. Description of the Prior Art

The automotive industry is faced with legislative mandates which require continued improved fuel economy. In order to achieve these higher fuel economy goals, the automotive industry has downsized large vehicles. Furthermore, the automotive industry has investigated the use of lower weight materials. Among the types of materials which may be employed are those produced by reaction injection molded polyurethanes. In order for these products to meet the demanding requirements for their application, they must be sufficiently rigid to be self supporting, have thermal dimensional stability to allow for normal processing operations at elevated temperatures, have low coefficients of thermal expansion, have a class A surface and good paintability, and enjoy good impact characteristics at low temperatures.

The reaction injection molded polyurethanes of the instant invention are generally prepared by reacting a mixture of polyoxyalkylene polyether polyol with various polyisocyanates and incorporating therein chain extenders such as ethylene glycol and/or butanediol while maintaining a low free water content prior to annealing of the elastomer.

U.S. Pat. No. 3,892,691 teaches the preparation of polyurethane products employing quasi prepolymers of diphenylmethanediisocyanate and dipropylene glycols together with a polypropylene ether triol such as is prepared by the reaction of ethylene and propylene oxide with trimethylolpropane or glycerol and the use of the chain extender 1,4-butanediol.

U.S. Pat. No. 4,243,760 teaches the preparation of reaction injection molded polyurethane products by employing chain extending agents such as ethylene glycol, propylene glycol and 1,4-butanediol.

U.S. Pat. No. 4,102,833 also teaches the preparation of reaction injection molded urethanes by employing long chain polyols together with a short chain diol or triol such as ethylene glycol or glycerol.

None of the prior art, however, recognizes that addition of minor amounts of aniline will result in improved physical properties when the polyisocyanate is crude MDI.

SUMMARY OF THE INVENTION

This invention comprises reaction injection molded (RIM) polyurethane elastomers having improved thermal dimensionally stable characteristics comprising the reaction product of an organic polyisocyanate (crude MDI), a polyoxyalkylene polyether polyol, and a chain extender and employing effective amounts of aniline as an additive.

DETAILED DESCRIPTION OF THE INVENTION

Polyurethane compositions used in making reaction injection molded polyurethane elastomers are prepared in the usual manner using conventional techniques.

The invention comprises reacting crude diphenylmethane diisocyanate with a polyether polyol, a chain extender, and an effective amount of aniline. This amount of aniline ranges from about 1 to about 12 parts of aniline per 100 parts of polyol.

The chain extending agent may be chosen from a wide variety of chain extenders which include ethylene glycol, propylene glycol, 1,4-butanediol, glycerine, amino alcohols or mixtures thereof. The preferred chain extenders are ethylene glycol and butanediol. The concentration of chain extender may range from 10 percent to 30 percent based on the total weight of polyol and chain extender. The preferred range is from 15 percent to 25 percent based on the total weight of polyol and chain extender. The concentration of polyol would thus range from 90 percent to 70 percent, preferably from 85 percent to 75 percent based on the total weight of polyol and chain extender.

Representative polyols which may be employed in the RIM process include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric sulfur-containing esters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used. Generally, the equivalent weight of the polyols will vary from 100 to 10,000, preferably from 1000 to 3000.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, sorbitol and sucrose. Also included within the term "polyhydric alcohol" are compounds derived from phenol such as 2,2'-bis(4,4'-hydroxyphenyl)propane, commonly known as Bisphenol A.

Any suitable polyoxyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Those preferred are the ethylene, propylene and butylene oxide adducts of ethylene glycol, propylene glycol, butylene glycol, glycerol, 1,1,1-trimethylolpropane, 1,1,1-trimethylolethane, 1,2,6-hexanetriol, α-methyl-glucoside, pentaerythritol, sorbitol, 2,2'-(4,4'-hydroxyphenyl)propane and sucrose, and mixtures thereof with equivalent weights from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylenedianiline, the condensation products of aniline and formaldehyde, and 2,4-diaminotoluene; aliphatic amines such as methylamine, triisopropanolamine, ethylenediamine, 1,3-diaminopropane, 1,3-diaminobutane, and 1,4-diaminobutane.

Although any polyoxyalkylene polyether polyols may be employed, the preferred high molecular weight polyether polyols are those which contain grafted therein vinylic monomers.

The polyols which have incorporated therein the vinylic polymers may be prepared (1) by the in situ free-radical polymerization of an ethylenically unsaturated monomer or mixture of monomers in a polyol, or (2) by dispersion in a polyol of a preformed graft polymer prepared by free-radical polymerization in a solvent such as described in U.S. Pat. Nos. 3,931,092, 4,014,846, 4,093,573, and 4,122,056, the disclosures of which are herein incorporated by reference, or (3) by low temperature polymerization in the presence of chain transfer agents. These polymerizations may be carried out at a temperature between 65° C. and 170° C., preferably between 75° C. and 135° C.

The amount of ethylenically unsaturated monomer employed in the polymerization reaction is generally from one percent to 60 percent, preferably from 10 percent to 40 percent, based on the total weight of the product. The polymerization occurs at a temperature between about 80° C. and 170° C., preferably from 75° C. to 135° C.

The polyols which may be employed in the preparation of the graft polymer dispersions are well known in the art. Both conventional polyols essentially free from ethylenic unsaturation such as those described in U.S. Pat. No. Re. 28,715 and unsaturated polyols such as those described in U.S. Pat. No. 3,652,659 and No. Re.29,014 may be employed in preparing the graft polymer dispersions used in the instant invention, the disclosures of which are incorporated by reference. Representative polyols essentially free from ethylenic unsaturation which may be employed are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,459; 3,190,927, and 3,346,557, the disclosures of which are incorporated by reference. Preferred polyhydroxyl-containing phosphorus compounds are prepared from alkylene oxides and acids of phosphorus having a $P_2O_5$ equivalency of from about 72 percent about 95 percent.

The unsaturated polyols which may be employed for preparation of graft copolymer dispersions may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, and halogenated maleic acids and anhydrides, unsaturated polyhydric alcohols such as 2-butene-1,4-diol, glycerol allyl ether, trimethylolpropane allyl ether, pentaerythritol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene monoxide, butadiene monoxide, vinyl glycidyl ether, glycidyl methacrylate and 3-allyloxypropylene oxide.

As mentioned above, the graft polymer dispersions used in the invention are prepared by the in situ polymerization of an ethylenically unsaturated monomer or a mixture of ethylenically unsaturated monomers, either in a solvent or in the above-described polyols. Representative ethylenically unsaturated monomers which may be employed in the present invention include butadiene, isoprene, 1,4-pentadiene, 1,5-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl-4-vinylbenzoate, phenoxystyrene, p-vinyldiphenyl sulfide, p-vinylphenyl phenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, 2-ethylhexyl acrylate, phenyl acrylate, phenyl methacrylate, α-chloroacrylonitrile, methacrylonitrile, N,N-dimethylacrylamide, N,N-dibenzylacrylamide, N-butylacrylamide, methacryl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxyacetate, vinyl benzoate, vinyl iodide, vinyltoluene, vinylnaphthalene, vinyl bromide, vinyl fluoride, vinylidene bromide, 1-chloro-1-fluoroethylene, vinylidene fluoride, vinyl methyl ether, vinyl ethyl ether, vinyl propyl ether, vinyl butyl ether, vinyl 2-ethylhexyl ether, vinyl phenyl ether, vinyl 2-butoxyethyl ether, 2,4-dihydro-1,2-pyran, 2-butoxy-2'-vinyloxy diethyl ether, vinyl 2-ethylthioethyl ether, vinyl methyl ketone, vinyl ethyl ketone, vinyl phenyl ketone, vinyl phosphonates such as bis(β-chloroethyl) vinylphosphonate, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention. Preferably, the monomer is selected from the group consisting of acrylonitrile, styrene, methyl methacrylate and mixtures thereof.

Illustrative initiators which may be employed for the polymerization of vinyl monomers are the well-known free radical types of vinyl polymerization initiators, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, di-α-cumyl peroxide, dipropyl peroxide, diisopropyl peroxide, isopropyl-t-butyl peroxide, butyl-t-butyl peroxide, difuroyl peroxide, ditriphenylmethyl peroxide, bis(p-methoxybenzoyl) peroxide, p-monoethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, α-methylbenzyl hydroperoxide, α-methyl- α-ethyl benzyl hydroperoxide, tetralin hydroperoxide, triphenylmethyl hydroperoxide, diphenylmethyl hydroperoxide, α-α'-azo-bis(2-methyl) butyronitrile, α,α'-azo-bis(2-methyl) heptonitrile, 1,1'-azo-bis(1-cyclohexane) carbonitrile, dimethyl α,α'-azo-bis(isobutyronitrile), 4,4'-azo-bis(4-cyanopetanoic) acid, azo-bis-(isobutyronitrile), 1-t-amylazo-1-cyanocyclohexane, 2-t-butylazo-2-cyano-4-methoxy-4-methylpentane, 2-t-butylazo-2-cyano-4-methylpentane, 2-(t-butylazo)isobutyronitrile, 2-t-butylazo-2-cyanobutane, 1-cyano-1-(t-butylazo)cyclohexane, t-butyl peroxy-2-ethylhexanoate, t-butylperpivalate, 2,5-dimethyl-hexane-2,5-diper-2-ethyl hexoate, t-butylperneo-decanoate, t-butylperbenzoate, t-butyl percrotonate, persuccinic acid, diisopropyl peroxydicarbonate, and the like; a mixture of initiators may also be used. Photochemically sensitive radical generators may also be employed. Generally, from about 0.5 percent to about 10 percent, preferably from about 1 percent to about 4 percent, by weight of initiator based on the weight of the monomer will be employed in the final polymerization.

Stabilizers may be employed during the process of making the graft polymer dispersions. One such example is the stabilizer disclosed in U.S. Pat. No. 4,148,840 which comprises a copolymer having a first portion composed of an ethylenically unsaturated monomer or mixture of such monomers and a second portion which is a propylene oxide polymer. Other stabilizers which may be employed are the alkylene oxide adducts of copolymers of styrene-allyl alcohol.

The RIM elastomers are generally prepared by the reaction of a polyoxyalkylene polyether polyol with an organic polyisocyanate optionally in the presence of additional polyhydroxyl-containing components, chain-extending agents, catalysts, surface-active agents, stabilizers, dyes, fillers such as milled glass fibers and pigments. Suitable processes for the preparation of cellular polyurethane plastics are disclosed in U.S. Pat. No. Re. 24,514 together with suitable machinery to be used in conjunction therewith. It is also possible to proceed with the preparation of the polyurethane elastomers by a prepolymer technique wherein an excess of organic polyisocyanate is reacted in a first step with the polyol to prepare a prepolymer having free isocyanate groups which is then reacted in a second step with more polyol. Alternately, the components may be reacted in a single working step commonly known as the "one-shot" technique of preparing polyurethanes.

The organic polyisocyanate employed in the instant invention corresponds to the formula R'(NCO)z wherein R' is a polyvalent organic radical which is either aliphatic, arylalkyl, alkylaryl, aromatic or mixtures thereof and z is an integer which corresponds to the valence of R' and is at least 2. Representative of the types of organic polyisocyanates contemplated herein include, for example, 1,2-diisocyanatoethane, 1,3-diisocyanatopropane, 1,2-diisocyanatopropane, 1,4-diisocyanatobutane, 1,5-diisocyanatopentane, 1,6- diisocyanatohexane, bis(3-isocyanatopropyl)ether, bis(3-isocyanatopropyl)sulfide, 1,7-diisocyanatoheptane, 1,5-diisocyanato-2,2-dimethylpentane, 1,6-diisocyanate-3-methoxyhexane, 1,8-diisocyanatooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis-(isocyanatohexyl)sulfide, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4-toluene diisocyanate, 2,6-toluene diisocyanate, mixtures of 2,4- and 2,6-toluene diisocyanate, 1,6-hexamethylene diisocyanate, 1,4-tetramethylene diisocyanate, 1,4-cyclohexane diisocyanate, hexahydrotoluene diisocyanate, 1,5-naphthylene diisocyanate, 1-methoxy-2,4-phenylene diisocyanate, 4,4'-cyclohexane diisocyanate, hexahydrotoluene diisocyanate, 1,5-naphthylene diisocyanate, 1-methoxy-2,4-phenylene diisocyanate, 4,4'-diphenylmethane diisocyanate, 4,4'-biphenylene diisocyanate, 3,3'-dimethyl-4,4'-diphenylmethane diisocyanate, 3,3'-dimethyl-4,4'-diphenylmethane diisocyanate and 3,3'-di-methyldiphenylmethane-4,4'-diisocyanate; the triisocyanates such as 4,4',4''-triphenylmethane triisocyanate, polymethylene polyphenylene polyisocyanate and 2,4,6-toluene triisocyanatate; and the tetraisocyanates such as 4,4'-dimethyl-2,2'-5,5'-diphenylmethane tetraisocyanate. Especially useful due to their availability and properties are toluene diisocyanate, 2,4'-diphenylmethane diisocyanate, 4,4'-diphenylmethane diisocyanate, polymethylene polyphenylene polyisocyanate, and mixtures thereof.

These polyisocyanates are prepared by conventional methods known in the art such as the phosgenation of the corresponding organic amine. Included within the useable isocyanates are the modifications of the above isocyanates which contain carbodiimide, allophanate or isocyanurate structures. Quasi-prepolymers may also be employed in the process of the subject invention. These quasi-prepolymers are prepared by reacting an excess of organic polyisocyanate or mixtures thereof with a minor amount of an active hydrogen-containing compound a determined by the well-known Zerewitinoff test, as described by Kohler in *Journal of the American Chemical Society*, 49, 3181 (1927). These compounds and their methods of preparation are well known in the art. The use of any one specific active hydrogen compound is not critical hereto, rather any such compound can be employed herein. Generally, the quasi-prepolymers have a free isocyanate content of from 20 percent to 40 percent by weight.

Crude polyisocyanates are preferably used in the compositions of the present invention, such as crude toluene diisocyanate obtained by the phosgenation of a mixture of toluene diamines or crude polymethylene polyphenylene polyisocyanate obtained by the phosgenation of crude polymethylene polyphenylene polyamine.

The graft polymer polyols may be employed along with another polyhydroxyl-containing component commonly employed in the art. Any of the polyhydroxyl-containing components which are described above for use in the preparation of the graft polyols may be employed in the preparation of the polyurethane foams useful in producing polyurethane elastomers in the present invention.

Catalysts that are useful in accordance with this invention include:

A. tertiary amines such as triethylene diamine, bis(-dimethylamino ethyl)ether, triethylamine, N-methylmorpholine, N-ethylmorpholine, N,N-dimethylbenzylamine, N,N-dimethylethanolamine, and the like;

B. tertiary phosphines, such as, trialkyl phosphines, dialkyl benzyl phosphines, and the like;

C. strong bases such as alkaline and alkali earth metal hydroxides, and phenoxides;

D. acidic metal salts of strong acids such as ferric chloride, stannic chloride, stannous chloride, antimony trichloride, bismuth nitrate and chloride and the like;

E. chelates of various metals such as those obtained from acetylacetone, benzoyl acetone, ethyl acetoacetate and the like;

F. alcoholates and phenolates of various metals such as $Ti(OR)_4$, $Sn(OR)_2$, $Al(OR)_3$, and the like wherein R is alkyl or aryl and the like;

G. salts of organic acids with a variety of metals such as alkali metals, alkaline earth metals, Al, Sn, Mn, Pb, Co, Ni, and Cu, including, for example, sodium acetate, potassium laurate, calcium hexanoate, stannous acetate, stannous octoate, stannous oleate, lead octoate, metallic dryers such as manganese and cobalt naphthenates, and the like;

H. organic metallic derivatives of tetravalent tin, trivalent and pentavalent arsenic, antimony and bismuth, and metal carbonyls of iron, cobalt and nickel.

The parts given in the examples are by weight unless otherwise indicated. The following abbreviations are employed in the examples:

Polyol A—is a propylene oxide-ethylene oxide adduct of trimethylolpropane having a molecular weight of about 5100, a hydroxyl number of 25 and containing 15 percent ethylene oxide.

Polyol B—is a propylene oxide-ethylene oxide adduct of propylene glycol having a molecular weight of 3800, a hydroxyl number of 26, and containing 20 percent ethylene oxide.

Polyol C—is a propylene oxide-ethylene oxide adduct of glycerine and propylene glycol having a hydroxyl number of 33 containing 15 percent ethylene oxide, reacted with allyl glycidyl ether to contain 0.3 moles of unsaturation per mole of polyol and further reacted with 20 percent 2:3 acrylonitrile:styrene monomer resulting in a hydroxyl number of 26.

Catalyst A—is dibutyl tin dilaurate.

Isocyanate A—is a crude diphenylmethane diisocyanate sold by Upjohn Corporation under the name Isonate 191.

TABLE I

| Example | 1 | 2 | 3 | 4 |
|---|---|---|---|---|
| Formulation, pbw | | | | |
| Polyol A | 65 | 65 | 65 | 65 |
| Polyol B | 30 | 30 | 30 | 30 |
| Polyol C | 5 | 5 | 5 | 5 |
| 1,4-butanediol | 25 | 25 | 25 | 25 |
| Aniline | — | 2 | 4 | 6 |
| T-12 Catalyst | 0.075 | 0.075 | 0.075 | 0.075 |
| Isocyanate A/100R | 70.0 | 71.3 | 72.7 | 73.9 |
| Index | 105 | 105 | 105 | 105 |
| Physical Properties* | | | | |
| Density, pcf | 64.4 | 66.0 | 64.8 | 65.0 |
| 100% Modulus, psi | — | — | — | 2315 |
| Tensile Strength, psi | 1960 | 2395 | 2280 | 2415 |
| Elongation, % | 35 | 70 | 95 | 110 |
| Hardness (Shore D) | 50–48 | 54–50 | 55–50 | 56–53 |
| Split Tear, pi | 95 | 161 | 170 | 213 |

TABLE I-continued

| Example | 1 | 2 | 3 | 4 |
|---|---|---|---|---|
| Graves Tear, pi | 392 | 485 | 506 | 544 |
| Flex Recovery | 16/10 | 20/12 | 20/15 | 25/15 |
| Heat Sag, in., at 250° F. | 0.33 | 0.46 | 0.64 | 0.63 |
| Tangential Modulus, K psi, −20° F. | 50.5 | 70.8 | 84.2 | 104.1 |
| 72° F. | 27.8 | 35.6 | 40.1 | 45.6 |
| 158° F. | 7.7 | 8.0 | 7.7 | 8.9 |
| Ratio −20° F./158° F. | 6.6 | 8.8 | 10.9 | 11.7 |

*Post cured 45 minutes at 250° F.

TABLE II

| Example | 5 | 6 | 7 | 8 | 9 |
|---|---|---|---|---|---|
| Formulation, pbw | | | | | |
| Polyol B | 100 | — | — | — | — |
| Ethylene Glycol | 15 | — | — | — | — |
| Aniline | — | 2 | 4 | 6 | 8 |
| T-12 Catalyst | 0.075 | — | — | — | — |
| Isocyanate A/100R | 67.0 | 68.5 | 70.0 | 71.4 | 72.8 |
| Index | 105 | — | — | — | — |

TABLE II-continued

| Example | 5 | 6 | 7 | 8 | 9 |
|---|---|---|---|---|---|
| Physical Properties* | | | | | |
| Density, pcf | 64.2 | 64.7 | 65.9 | 67.7 | 65.9 |
| 100% Modulus, psi | 1693 | 1603 | 1700 | 1603 | 1590 |
| Tensile Strength, psi | 1993 | 2053 | 1910 | 1727 | 1660 |
| Elongation, % | 120 | 180 | 157 | 147 | 133 |
| Hardness (Shore D) | 44/44 | 49/46 | 51/49 | 52/50 | 50/48 |
| Split Tear, pi | 121 | 183 | 218 | 203 | 197 |
| Graves Tear, pi | 399 | 435 | 433 | 429 | 410 |
| Flex Recovery | 11/9 | 14/8 | 18/11 | 21/14 | 25/17 |
| Heat Sag, in., at 250° F. | 0.38 | 0.48 | 0.55 | 0.47 | 0.31 |
| Tangential Modulus, K psi, | | | | | |
| −20° F. | 37.8 | 54.7 | 73.2 | 79.4 | 92.0 |
| 72° F. | 14.6 | 15.4 | 20.8 | 24.1 | 32.0 |
| 158° F. | 6.7 | 5.6 | 6.6 | 8.1 | 12.3 |
| Ratio −20° F./158° F. | 5.61 | 9.76 | 11.09 | 9.81 | 7.48 |

*Post cured 45 minutes at 250° F.

TABLE III

| Example | 10 | 11 | 12 | 13 | 14 | 15 | 16 | 17 |
|---|---|---|---|---|---|---|---|---|
| Formulation, pbw | | | | | | | | |
| Polyol A | 100 | 100 | 100 | 100 | 100 | 100 | 100 | 100 |
| 1,4-butanediol | 24 | 18 | 21 | 21 | 24 | 21 | 18 | 21 |
| Aniline | 6 | 2 | 1 | 4 | 2 | 8 | 6 | 2 |
| T-12 Catalyst | 0.1 | 0.1 | 0.1 | 0.1 | 0.1 | 0.1 | 0.1 | 0.1 |
| Isocyanate A/100R | 72.0 | 56.5 | 62.3 | 64.6 | 69.3 | 67.4 | 59.8 | 63.1 |
| Index | 105 | 105 | 105 | 105 | 105 | 105 | 105 | 105 |
| Physical Properties* | | | | | | | | |
| Density, pcf | 61.8 | 60.9 | 60.6 | | | | | 61.2 |
| 100% Modulus, psi | 1957 | 1343 | — | 1700 | — | 1513 | 1297 | — |
| Tensile Strength, psi | 2027 | 1490 | 1770 | 1963 | 1897 | 1680 | 1543 | 1743 |
| Elongation, % | 113 | 117 | 90 | 140 | 83 | 143 | 170 | 97 |
| Hardness (Shore D) | 52–49 | 44–39 | 47–43 | 49–42 | 49–45 | 48–44 | 44–40 | 47–43 |
| Split Tear, pi | 219 | 103 | 110 | 183 | 141 | 221 | 187 | 129 |
| Graves Tear, pi | 431 | 278 | 317 | 373 | 368 | 365 | 319 | 339 |
| Flex Recovery | 18/8 | 13/5 | 14/7 | 15/8 | 14/7 | 20/12 | 16/9 | 12/5 |
| Heat Sag, in., at 250° F. | 0.48 | 0.53 | 0.41 | 0.49 | 0.38 | 0.45 | 0.45 | 0.45 |
| Tangential Modulus, K psi, | | | | | | | | |
| −20° F. | 97.3 | 40.2 | 57.0 | 82.8 | 88.8 | 90.5 | 60.3 | 65.0 |
| 72° F. | 28.4 | 9.2 | 15.1 | 17.3 | 23.0 | 22.7 | 13.5 | 15.0 |
| 158° F. | 9.8 | 4.5 | 5.4 | 6.1 | 7.9 | 8.0 | 5.3 | 5.8 |
| Ratio −20° F./158° F. | 9.93 | 8.93 | 10.56 | 13.65 | 11.24 | 11.36 | 11.45 | 11.21 |

*Post cured 45 minutes at 250° F.

TABLE IV

| Example | 18 | 19 | 20 | 21 | 22 | 23 | 24 | 25 | 26 | 27 | 28 |
|---|---|---|---|---|---|---|---|---|---|---|---|
| Formulation, pbw | | | | | | | | | | | |
| Polyol B | 100 | 100 | 100 | 100 | 100 | 100 | 100 | 100 | 100 | 100 | 100 |
| Ethylene Glycol | 18 | 12 | 12 | 18 | 16.5 | 18 | 18 | 18 | 15 | 13.5 | 18 |
| Aniline | 2 | 6 | 3 | 9 | 4.5 | 3 | 6 | 1 | 6 | 7.5 | 12 |
| T-12 Catalyst | 0.075 | 0.075 | 0.075 | 0.075 | 0.075 | 0.075 | 0.075 | 0.075 | 0.075 | 0.075 | 0.075 |
| Isocyanate Al/100R | 78.5 | 61.3 | 58.8 | 82.8 | 75.3 | 79.2 | 81.1 | 77.9 | 71.4 | 67.5 | 84.5 |
| Index | 105 | 105 | 105 | 105 | 105 | 105 | 105 | 105 | 105 | 105 | 105 |
| Physical Properties* | | | | | | | | | | | |
| Density, pcf | 60.1 | 59.8 | 59.7 | 60.6 | 60.3 | 60.7 | 60.9 | 60.3 | 59.8 | 60.1 | 61.9 |
| 100% Modulus, psi | — | 973 | 1047 | — | 1550 | 1757 | 1703 | — | 1310 | 1140 | — |
| Tensile Strength, psi | 1920 | 1140 | 1443 | 1667 | 1750 | 1950 | 1800 | 1937 | 1447 | 1210 | 1450 |
| Elongation, % | 100 | 180 | 207 | 70 | 113 | 123 | 100 | 153 | 153 | 153 | nil |
| Hardness (Shore D) | 45–42 | 38–32 | 37–31 | 51–46 | 47–41 | 48–43 | 51–47 | 45–41 | 44–39 | 43–39 | 54–49 |
| Split Tear, pi | 145 | 165 | 123 | 117 | 223 | 153 | 197 | 172 | 175 | 173 | (b) |
| Graves Tear, pi | 373 | 247 | 262 | 333 | 340 | 353 | 364 | 348 | 299 | 270 | 235 |
| Flex Recovery | 17/11 | 16/11 | 10/6 | 30/19 | 16/10 | 16/9 | 21/14 | 17/8 | 19/12 | 20/14 | 30/22 |
| Heat Sag, in., at 250° F. | 0.35 | 0.68 | 0.75 | 0.29 | 0.41 | 0.51 | 0.29 | 0.28 | 0.33 | 0.34 | 0.22 |
| Tangential Modulus, K psi, | | | | | | | | | | | |
| −20° F. | 55.8 | 40.3 | 23.5 | 98.5 | 63.0 | 63.0 | 82.0 | 53.7 | 63.3 | 61.1 | 116.3 |
| 72° F. | 15.7 | 9.0 | 5.4 | 31.7 | 13.7 | 16.9 | 23.4 | 17.6 | 17.0 | 17.8 | 42.7 |
| 158° F. | 7.6 | 4.5 | 2.8 | 14.4 | 7.3 | 8.3 | 11.5 | 8.9 | 8.0 | 9.1 | 22.3 |
| Ratio −20° F./158° F. | 7.3 | 8.90 | 8.40 | 6.83 | 8.59 | 7.56 | 7.15 | 6.06 | 7.95 | 6.72 | 5.22 |

*Post cured 45 minutes at 250° F.

The data in the tables shows improvement in tensile strength, tear strength and room temperature tangential modulus when employing the products of the invention.

The embodiments of the invention in which an exclusive privilege or property is claimed are defined as follows:

1. A dimensionally stable reaction injection molded polyurethane elastomer comprising the reaction product of crude diphenylmethane diisocyanate, a polyoxyalkylene polyether polyol or mixture thereof and a chain extender wherein said elastomer contains an effective amount of aniline for improving the tensile strength, tear strength, and room temperature tangential modulus.

2. The elastomer of claim 1 wherein the amount of aniline is from about 1 to about 12 parts per 100 parts of polyol.

3. The elastomer of claim 1 wherein said polyol is a graft polymer dispersion prepared by the in situ free radical polymerization of an ethylenically unsaturated monomer or monomers in a polyol.

4. The elastomer of claim 1 wherein the concentration of said chain extender is from 10 percent to 30 percent based on the total weight of polyol and chain extender.

5. The elastomer of claim 1 wherein said polyisocyanate is crude carbodiimide modified diphenylmethane diisocyanate.

6. The elastomer of claim 3 wherein said unsaturated monomer is selected from the group consisting of acrylonitrile, styrene and methyl methacrylate.

7. In a process for preparing a dimensionally stable reaction injection molded polyurethane elastomer which comprises (a) reacting a crude diphenylmethane diisocyanate, a polyoxyalkylene polyether polyol or mixtures thereof and a chain extender, and (b) curing said elastomer at temperatures from 120° C. to 210° C., the improvement which comprises employing an effective amount of aniline in step (a) for improving the tensile strength, tear strength, and room temperature tangential modulus.

8. The process of claim 7 wherein the amount of aniline is from about 1 to about 12 parts per 100 parts of polyol.

9. The process of claim 7 wherein said polyol is a graft polymer dispersion prepared by the in situ free radical polymerization of an ethylenically unsaturated monomer or monomers in a polyol.

10. The process of claim 7 wherein the concentration of said chain extender is from 10 percent to 30 percent based on the total weight of polyol and chain extender.

11. The process of claim 7 wherein said polyisocyanate is crude carbodiimide modified diphenylmethane diisocyanate.

12. The process of claim 9 wherein said unsaturated monomer is selected from the group consisting of acrylonitrile, styrene and methyl methacrylate.

* * * * *